United States Patent Office 3,790,576
Patented Feb. 5, 1974

3,790,576
9 SUBSTITUTED 4,9-DIHYDRO-1,3,4,4-TETRA-ALKYL-1H-PYRAZOLO[3,4-b]QUINOLINES
Horace A. De Wald, Ann Arbor, Mich., assignor to Parke Davis & Company, Detroit, Mich.
No Drawing. Filed Mar. 20, 1972, Ser. No. 236,459
Int. Cl. C07d 33/52
U.S. Cl. 260—286 R                                      10 Claims

ABSTRACT OF THE DISCLOSURE 4,9 - dihydro-1H-pyrazolo[3,4-b]quinoline compounds, substituted in the 1-position by alkyl or 2-hydroxyethyl, in the 3- and 4-positions by methyl or ethyl, optionally in the 6- or 7-position by methyl, chloro, fluoro, methoxy, or methylthio, and optionally in the 9-position by a 3-(amino, methylamino, or dimethylamino)propyl group or a 3-(dimethylamino)propyl, N-oxide group; salts thereof; and their production by (a) cyclizing an o-[(pyrazol-5-yl)-amino]-α,α-dialkylbenzyl alcohol, (b) reacting an alkali metal salt of one of the 9-unsubstituted compounds with a 3-(dimethylamino)propyl halide, (c) reacting a 9-(3-halopropyl)-intermediate with methylamine, (d) reducing a 9-(3-azidopropyl)-intermediate, and (e) reacting one of the 9-[3-(dimethylamino)propyl]-compounds with an oxidizing agent. The compounds are useful as intermediates and as antidepressant agents.

---

The present invention relates to new heterocyclic nitrogen compounds that are useful as chemical intermediates and as pharmacological agents and to methods for their production. More particularly, the invention relates to new 4,9-dihydro-1H-pyrazolo[3,4-b]quinoline compounds having the formula

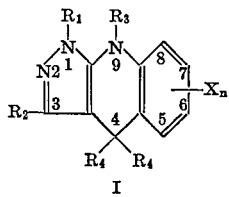

I and to pharmaceutically-acceptable salts thereof; where $R_1$ is an alkyl group having not more than 4 carbon atoms or 2-hydroxyethyl, each of $R_2$ and $R_4$ is methyl or ethyl, $R_3$ is hydrogen, 3-aminopropyl, 3-(methylamino)propyl, 3 - (dimethylamino)propyl, or a 3 - (dimethylamino)propyl, N-oxide group, that is, a group having the formula

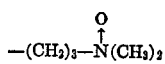

X is methyl, chloro, fluoro, methoxy, or methylthio, substituted in the 6- or 7-position, and $n$ is zero or one.

In accordance with the invention, 4,9-dihydro-1H-pyrazolo[3,4-b]quinoline compounds having the formula

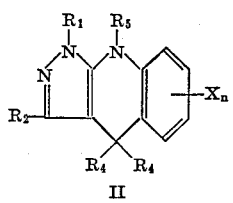

II and salts thereof are produced by cyclizing an o-[(pyrazol-5-yl)amino]-α,α-dialkylbenzyl alcohol compound having the formula

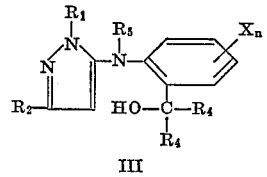

III where each of $R_1$, $R_2$, $R_4$, X and $n$ has the same meaning as given above and $R_5$ is hydrogen or 3-(dimethylamino)propyl. The cyclization (ring closure) reaction can be carried out using any of a variety of agents capable of removing the elements of water from the benzyl alcohol starting material of Formula III above with the formation of the 4,9-dihydro - 1H - pyrazolo-[3,4-b]quinoline ring. Suitable cyclizing agents include phosphoric acid, polyphosphoric acid, concentrated sulfuric acid, aluminum chloride, hydrofluoric acid, and fluorosulfonic acid. Of these, 85% phosphoric acid is preferred. The reaction can be carried out either with or without a solvent. With aluminum chloride, an aromatic solvent, such as nitrobenzene, xylene, or toluene, is required. With the other cyclizing agents mentioned above, while a solvent such as formic or acetic acid may be used, it is most convenient and practical to carry out the reaction in the presence of an excess of the cyclizing agent without added solvent. Thus, with the preferred cyclizing agent, the reaction is normally carried out employing a 10- to 30-fold excess of the 85% phosphoric acid. Neither the temperature nor the duration of the reaction is critical, and both may be varied over a wide range, the temperature from 0–120° C. and the duration from one to 12 hours.

When the preferred 85% phosphoric acid cyclizing agent is used, the reaction is best carried out at a temperature in the range of from 85 to 110° C., and at that temperature, is essentially complete after a period of from 2 to 6 hours. The 4,9-dihydro-1H-pyrazolo[3,4-b]quinoline product is normally isolated in free base form by diluting the reaction mixture with water and neutralizing the resulting aqueous mixture. The free base product may then be converted to an acid-addition salt by reaction with an acid.

The o-[(pyrazol-5-yl)amino]-α,α-dialkylbenzyl alcohol compounds having Formula III above that are used as starting materials in the foregoing process are prepared as follows. The starting compounds of Formula III wherein $R_5$ is hydrogen are prepared by reacting a N-(pyrazol-5-yl)anthranilic acid, methyl ester having the formula

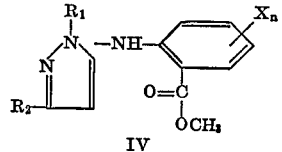

IV or a salt thereof with a methyl- or ethyl-magnesium halide having the formula

R₄MgHal                                      (V)

and hydrolyzing the reaction mixture. The starting materials of Formula III wherein $R_5$ is a 3-(dimethylamino) propyl group are prepared by reacting one of the o-[(pyrazol-5-yl)amino]-α,α-dialkylbenzyl alcohols of Formula III wherein $R_5$ is hydrogen initially with n-butyl lithium and then reacting the lithiated intermediate with 3-(dimethylamino)propyl chloride.

The intermediate N-(pyrazol-5-yl)anthranilic acid, methyl esters of Formula IV above are prepared by various methods. In one method, an anthranilic acid having the formula

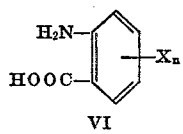

VI is first reacted with diketene in a mixture of acetic acid and acetic anhydride, and the intermediate product having the formula

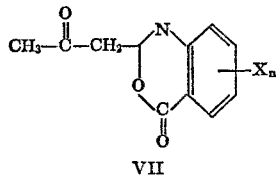

VII is reacted with a hydrazine compound having the formula $R_1NHNH_2$     VIII to give a N-(pyrazol-5-yl)anthranilic acid having the formula

IX which in turn is reacted with methanolic hydrogen chloride to give one of the desired methyl esters. In a second method, a 5-aminopyrazole having the formula

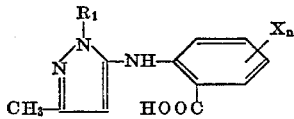

X is reacted with an o-chlorobenzoic acid having the formula

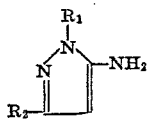

XI in the presence of a copper catalyst, such as cupric acetate, and a proton acceptor, such as potassium carbonate, to give a N-(pyrazol-5-yl)anthranilic acid having the formula

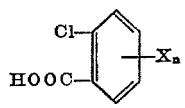

XII which is reacted with methanolic hydrogen chloride to give one of the desired methyl ester intermediates.

In the preceding Formulas IV through XII, each of $R_1$, $R_2$, $R_4$, X, and $n$ has the aforementioned significance and Hal represents bromine, chlorine, or iodine.

Also in accord with the invention, 9-[3-dimethylamino)propyl]-4,9-dihydro-1H-pyrazolo[3,4-b]-quinoline compounds having the formula

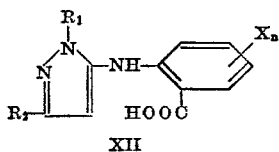

XIII and salts thereof are produced by reacting an alkali metal salt, preferably the sodium salt, of a 4,9-dihydro-1H-pyrazolo[3,4-b]quinoline compound having the formula

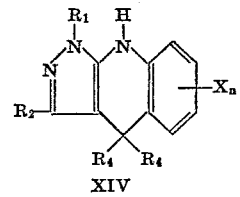

XIV with a 3-(dimethylamino)propyl halide having the formula

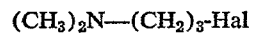

XV in a non-reactive solvent; where each of $R_1$, $R_2$, $R_4$, X, $n$, and Hal is as defined earlier. Suitable non-reactive solvents for the reaction are aromatic hydrocarbons, such as benzene, toluene, and xylene; ethers, such as dioxane, tetrahydrofuran, and glycol ethers having no free hydroxyl groups; tertiary amides, such as N,N-dimethylformamide; dimethyl sulfoxide; and mixtures of these. A preferred solvent is N,N-dimethylformamide. The temperature and duration of the reaction are not critical, and may be varied over a wide range, from 15–30° C. for 20–24 hours to 110–130° C. for 1–3 hours. A preferred temperature is one in the range of 50–60° C. and at such temperature the reaction is essentially complete after 5–10 hours but may be continued for a longer period to insure completion. Equivalent amounts of the reactants may be used, but it is preferable to employ the 3-(dimethylamino)propyl halide in moderate excess. The alkali metal salt of the 4,9-dihydro-1H-pyrazolo[3,4-b]quinoline is most conveniently prepared in situ by reacting the quinoline compound of Formula XIV with a strong base, such as an alkali metal hydride, preferably sodium hydride, an alkali metal amide, or an alkali metal alkoxide, in a non-reactive solvent, such as one of those listed above, at a temperature in the range of from 20–60° C. for a period of from 30 minutes to several hours or until salt formation is complete. If desired, the reaction may be carried out in a single step by heating a mixture of the quinoline compound, the 3-(dimethylamino)propyl halide, and the strong base in the chosen solvent until reaction is complete. The product of the reaction is isolated directly as the free base or following conversion to an acid-addition salt.

Further in accordance with the invention, 9-[3-methylamino)propyl]-4,9-dihydro - 1H - pyrazolo[3,4-b]-quinoline compounds having the formula

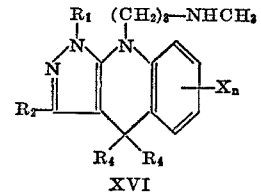

XVI and salts thereof are produced by reacting a 9-(3-halopropyl)-4,9-dihydro-1H-pyrazolo[3,4 - b]quinoline compound having the formula

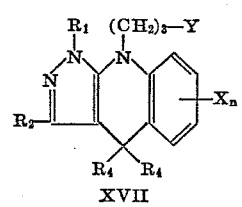

XVII with methylamine in the presence of a base; where each of $R_1$, $R_2$, $R_4$, X, and $n$ has the same meaning as previously given and Y is bromine or chlorine. Suitable bases that may be used in the reaction include alkali metal carbonates, alkali metal bicarbonates, alkaline earth metal oxides, alkaline earth metal hydroxides, and organic tertiary amines of stronger base strength than methylamine.

In practice, it is most convenient and preferable to employ a large excess of methylamine, in which case additional base is not required. In such a case added solvent is also not required, although a wide variety of non-reactive solvents can be used, if desired. These include aromatic hydrocarbons, lower alkanols, lower aliphatic ketones, ethers, acetonitrile, and dimethyl sulfoxide. A lower alkanol, especially 2-propanol, is preferred. The temperature and duration of the reaction are not critical and may be varied over a wide range, the temperature from 0–125° C. and the duration from one hour to several days. It is most convenient to carry out the reaction at the reflux temperature of the reaction mixture, and at such temperature the reaction is essentially complete after a period of from 3 to 18 hours. The product of the reaction is isolated directly as the free base or following conversion to an acid-addition salt.

The 9-(3-halopropyl)-4,9-dihydro-1H-pyrazolo[3,4-b]quinoline compounds having Formula XVII used as starting materials in the foregoing process are prepared by reacting an alkali metal salt of a 4,9-dihydro-1H-pyrazolo[3,4-b]quinoline compound having Formula XIV above with a trimethylene halide having the formula

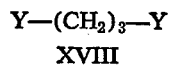

XVIII where Y is defined as above. If Y is the compound of Formula XVIII is both bromine and chlorine, that is, if 1-bromo-3-chloropropane is used, the resulting product is a mixture of 9-(3-bromopropyl)-4,9-dihydro-1H-pyrazolo[3,4-b]quinoline and 9-(3-chloropropyl)-4,9-dihydro-1H-pyrazolo[3,4-b]quinoline. This mixture can be used as starting material in the foregoing process with equivalent results to those obtained using either individual component of the mixture alone.

Still further in accord with the invention 9-(3-aminopropyl) - 4,9-dihydro-1H-pyrazolo[3,4-b]quinoline compounds having the formula

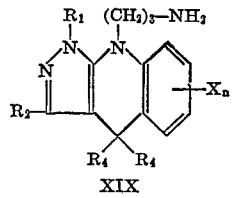

XIX and salts thereof are produced by reducing a 9-(3-azidopropyl) - 4,9 - dihydro-1H-pyrazolo[3,4-b]quinoline compound having the formula

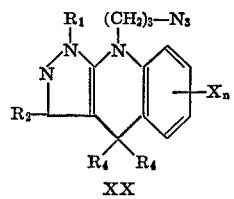

XX where each of $R_1$, $R_2$, $R_4$, X, and $n$ is as defined earlier. The reduction may be accomplished by employing catalytic or chemical means. The reduction is accomplished catalytically by using gaseous hydrogen and a noble metal catalyst, such as platinum, platinum oxide, palladium, or palladium oxide, which may optionally be supported on an inert carrier, such as charcoal. Chemical reducing agents that may be used include metals, such as tin and zinc, in the presence of an inorganic or organic acid, such as hydrochloric acid and acetic acid, and a complex metal hydride such as lithium aluminum hydride. The preferred method of reduction is reaction with lithium aluminum hydride in an anhydrous solvent medium such as ether or tetrahydrofuran. Suitable solvents that may be used for catalytic reduction include lower alkanols, such as ethanol, alone or mixed with water, lower alkanoic acid esters, such as ethyl acetate, and tertiary amides, such as N,N-dimethylformamide. The temperature and duration of the reaction will vary depending on the reduction means employed. With the preferred lithium aluminum hydride reducing agent, the reaction is best carried out at a temperature in the range of from 30 to 65° C., and at such temperature is essentially complete after 2 to 4 hours.

When catalytic reduction means are employed, the reaction is conveniently carried out at room temperature, with hydrogen supplied to the reaction at a pressure of from 30 to 50 lbs./in.²; reduction is essentially complete after a period of from 4 to 20 hours. When the reduction is accomplished with lithium aluminum hydride, best results are obtained using a moderate excess of the reducing agent. Following initial reaction with lithium aluminum hydride or other complex metal hydride reducing agent, the reaction mixture is hydrolyzed with an aqueous medium, such as water, dilute aqueous inorganic acids or bases, and other media containing water. While in ordinary practice a considerable excess of the aqueous medium is added, at least four moles of water should be used for each mole of lithium aluminum hydride to insure complete hydrolysis. The product of the reduction reaction may be isolated in free base or acid-addition salt form by appropriate adjustment of the pH of the reaction mixture.

The 9 - (3 - azidopropyl)-4,9-dihydro-1H-pyrazolo-[3,4-b]quinoline compounds having Formula XX above used as starting materials in the foregoing process are prepared by reacting a 9 - (3-halopropyl)-4,9-dihydro-1H-pyrazolo[3,4-b]quinoline compound of Formula XVII above with sodium azide in a non-reactive solvent such as N,N-dimethylformamide.

Further yet in accord with the invention, 9-[3-(dimethylamino)propyl]-4,9-dihydro-1H-pyrazolo-[3,4 - b]quinoline, $N^\gamma$-oxide compounds having the formula

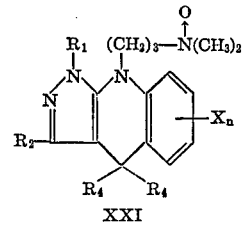

XXI and salts thereof are produced by reacting a 9-[3-(dimethylamino)propyl] - 4,9 - dihydro-1H-pyrazolo[3,4-b]-quinoline compound having Formula XIII above, that is,

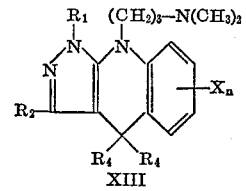

XIII with an oxidizing agent; where each of $R_1$, $R_2$, $R_4$, X, and $n$ is as previously defined. The oxidizing agent may be hydrogen peroxide or any of a number of organic peracids, including performic, peracetic, perbenzoic, pertrifluoroacetic, and m-chloroperbenzoic acids. A preferred oxidizing agent, because of its ready availability, handling ease, and relative stability, is m-chloroperbenzoic acid. The reaction is best carried out in a solvent medium. Suitable solvents for use with hydrogen peroxide are water, lower alkanols, and mixtures of these. Acceptable solvents for use with one of the peracids named above are aromatic hydrocarbons, such as benzene; chlorinated hydrocarbons, such as dichloromethane, chloroform, and tetrachloroethane; ether; and tertiary amides, such as N,N-dimethylformamide. A preferred solvent for use with the preferred m-chloroperbenzoic acid oxidizing agent is chloroform. The temperature and duration of the reaction are not critical and may be varied widely, the temperature from zero to 95° C. and the duration from one to 24 hours. The preferred temperature is one in the range of from 20 to 35° C., and at such temperature, the reaction is essentially complete after a period of from 8 to 16 hours. While equivalent quantities of reactants may be employed, best results are obtained with a moderate excess of the oxidizing agent. The product of the reaction may be isolated in free base or in acid-addition salt form by appropriate adjustment of the pH of the reaction mixture.

The compounds of the invention can exist in the free form having Formula I above or in the form of a salt. The compounds wherein $R_3$ is a 3-aminopropyl, 3-(methylaminopropyl), or 3-(dimethylamino)propyl are strongly basic and form pharmaceutically-acceptable acid-addition salts by reaction with any of a number of inorganic and organic acids, including hydrochloric, hydrobromic, hydriodic, sulfuric, nitric, phosphoric, acetic, benzoic, citric, maleic, malic, tartaric, succinic, gluconic, ascorbic, sulfamic, oxalic, pamoic, methanesulfonic, benzenesulfonic, and related acids. The compounds wherein $R_3$ is hydrogen or a 3 - (dimethylamino)propyl, N-oxide group are weakly basic and form pharmaceutically-acceptable acid-addition salts only with the inorganic acids named above and with certain strong organic acids such as methanesulfonic, benzenesulfonic, and p-toluene-sulfonic acids.

The free 4,9 - dihydro - 1H - pyrazolo[3,4-b]-quinoline compounds of the invention having Formula I wherein $R_3$ is hydrogen also form pharmaceutically-acceptable salts by reaction with a strong base, such as an alkali metal hydride. Such salts are not preferred forms of the invention, however, because they are relatively unstable and tend to dissociate under neutral conditions and in aqueous media.

The free 4,9 - dihydro - 1H - pyrazolo[3,4-b]-quinoline compounds and their salts may differ somewhat in certain physical properties, such as solubility in polar solvents, but they are otherwise equivalent for purposes of the invention.

The compounds of the invention can exist in anhydrous form as well as insolvated, including hydrated, forms. In general, the hydrated forms and the solvated forms with pharmaceutically-acceptable solvents are equivalent to the anhydrous or unsolvated forms for the purposes of the invention.

The compounds of the invention are new chemical compounds that are useful as chemical intermediates and as pharmacological agents. The use of certain of the present compounds as intermediates for the preparation of other compounds of the invention has already been described in the foregoing. As pharmacological agents, the compounds of the invention exhibit antidepressant activity that can be demonstrated and quantitatively determined in a pharmacological assay that measures the ability of a test compound to potentiate the known psychic energizing effect of methamphetamine. This assay is carried out as follows.

Male albino rats are deprived of food and water for twenty hours prior to test. At test time they are dosed intraperitoneally with the test compound, with separate groups of eight rats each receiving a dose of 10, 5, or 2.5 mg./kg. (base). Immediately following dosing the rats are placed in individual metabolism cages without food or water for a waiting period; for half the rats at each dose level the waiting period is 15 minutes, and for the other half it is two hours. After the waiting period, all the rats are given an intraperitoneal injection of 0.75 mg./kg. of methamphetamine (base), and then, twenty minutes later, are allowed access to a milk preparation in a graduated and calibrated tube. The preparation consists of one part sweetened condensed milk and two parts water. Total milk ingestion of each animal after 30 minutes, one hour, 90 minutes, and two hours is recorded and compared with that of control animals that are dosed only with methamphetamine. The total ingested after two hours is considered the critical amount, and is the one used to assess activity.

A test compound is considered to be an active antidepressant agent in this test if it shows significant methamphetamine potentiation, that is, enhanced inhibition of milk ingestion, at a dose of 10 mg./kg. (base) or less in either of the two groups of rats tested at each dosage level. Highly active antidepressant agents can be further differentiated if they show an increased enhancement of inhibition of milk ingestion in the group of test animals that are subjected to the two-hour waiting period between injections of the test compound and methamphetamine. Thus, since in this test rats dosed only with methamphetamine normally consume an average of 4.2 ml. of milk (per 100 g. of body weight), a test compound is considered to be active if at a dose of 10 mg./kg. (base) or less it leads to ingestion of 3.5 ml. or less in those rats dosed with methamphetamine 15 minutes after injection of the compound; and it is regarded as more highly active if at the same dosage it leads to an even lower ingestion of milk in those animals dosed with methamphetamine after a waiting period of two hours. By utilizing the foregoing test procedure it has been possible to demonstrate activity for the known clinically useful antidepressant agents, amitriptyline and imipramine, thereby confirming the validity of this assay for determining antidepressant activity.

The results obtained in this assay for some representative compounds of the present invention are shown in the following table, where the compounds are identified by reference to the examples that follow. In this table, the amounts of milk ingestion, in ml. per 100 g. of body weight, are given for both groups of rats at the indicated dose level, that is, for the group of rats dosed with methamphetamine 15 minutes after injection of the test compound and for the group dosed with methamphetamine after a two-hour waiting period.

ANTIDEPRESSANT ACTIVITY

| Compound | Dose, mg./kg. (base) | Milk ingestion, ml./100 g., after waiting period of— | |
|---|---|---|---|
| | | 15 min. | 2 hours |
| Example: | | | |
| 2(c) | 10 | 2.9 | 2.5 |
| 2(e) | 10 | 2.0 | 1.0 |
| | 5 | 3.4 | 0.0 |
| | 2.5 | 1.4 | 0.4 |
| 2(h) | 10 | 3.0 | 2.4 |
| 4 | 10 | 0.7 | 0.1 |
| | 5 | 1.9 | 0.0 |
| | 2.5 | 0.0 | 0.4 |
| 5(a) | 10 | 0.2 | 0.2 |
| | 5 | 1.4 | 1.1 |
| 5(b) | 10 | 0.1 | 0.0 |
| | 5 | 0.3 | 0.0 |
| | 2.5 | 1.8 | 0.4 |
| 5(d) | 10 | 0.4 | 0.0 |
| 5(h) | 10 | 0.5 | 0.2 |
| | 5 | 1.3 | 0.4 |
| | 2.5 | 0.7 | 0.2 |
| 5(i) | 10 | 0.3 | 0.4 |
| | 5 | 0.3 | 0.7 |
| 5(k) | 10 | 0.6 | 0.8 |
| | 5 | 0.5 | 0.9 |
| | 2.5 | 0.2 | 0.4 |
| 6 | 10 | 0.5 | 0.4 |
| | 5 | 0.1 | 0.3 |
| | 2.5 | 1.0 | 0.6 |
| 7 | 10 | 0.1 | 0.0 |
| | 5 | 0.1 | 0.2 |
| | 2.5 | 0.4 | 0.3 |
| 10(a) | 10 | 0.8 | 0.2 |
| | 5 | 0.5 | 0.4 |
| | 2.5 | 3.1 | 0.1 |
| 10(b) | 10 | 1.2 | 0.5 |

The compounds of the invention can be administered either orally or parenterally. They can be combined with a solid or liquid carrier or diluent and made available in varying amounts in such pharmaceutical forms as tablets, capsules, powders, and aqueous and non-aqueous suspensions and solutions.

The invention is illustrated by the following examples.

EXAMPLE 1

A mixture of 17 g. of o-[(1,3-dimethylpyrazol-5-yl) amino]-α,α-dimethylbenzyl alcohol and 90 ml. of 85% phosphoric acid is heated on a steam bath for 5 hours and is then poured into 250 ml. of ice-water. The resulting aqueous mixture is made alkaline with concentrated aqueous sodium hydroxide, and the alkaline mixture is extracted with chloroform. The chloroform extract is washed with saturated aqueous sodium bicarbonate, dried, and evaporated to dryness under reduced pressure to give a solid residue of 4,9-dihydro-1,3,4,4-tetramethyl-1H-pyrazolo[3,4-b]quinoline; M.P. 189° C., following crystallization from ethy acetate-petroleum ether.

EXAMPLE 2

Utilizing the procedure described in Example 1 above, the following 4,9 - dihydro-1H-pyrazolo[3,4-b]quinoline compounds are obtained from the reaction indicated below:

(a) From the reaction of 22.0 g. of o-[(1,3-dimethyl-pyrazol-5-yl)amino]-α,α-diethylbenzyl alcohol with 100 ml. of 85% phosphoric acid there is obtained 4,4-diethyl-4,9 - dihydro-1,3-dimethyl-1H-pyrazolo[3,4-b]quinoline; M.P. 215–217° C., following crystallization from chloroform-ether.

(b) From the reaction of 15.5 g. of o-[(3-methyl-1-propylpyrazol - 5-yl)amino]-α,α-dimethylbenzyl alcohol with 90 ml. of 85% phosphoric acid there is obtained 4,9-dihydro - 3,4,4 - trimethyl-1-propyl-1H-pyrazolo[3,4-b] quinoline; M.P. 179–181° C., following crystallization from ether.

(c) From the reaction of 19 g. of o{[1-(2-hydroxy-ethyl) - 3-methylpyrazol-5-yl]amino}-α,α-dimethylbenzyl alcohol with 90 ml. of 85% phosphoric acid there is obtained 4,9 - dihydro-3,4,4-trimethyl-1H-pyrazolo[3,4-b] quinoline-1-ethanol; M.P. 235–237° C., following crystallization from ethanol.

(d) From the reaction of 40 g. of 2-[(1,3-dimethyl-pyrazol-5-yl)amino]-5-methyl-α,α-dimethylbenzyl alcohol with 260 ml. of 85% phosphoric acid there is obtained 4,9 - dihydro - 1,3,4,4,6-pentamethyl-1H-pyrazolo[3,4-b] quinoline; M.P. 193–195° C., following crystallization from ethyl acetate.

(e) From the reaction of 43 g. of 2-[(1,3-dimethyl-pyrazol - 5-yl)amino]-5-chloro-α,α-dimethylbenzyl alcohol with 160 ml. of 85% phosphoric acid there is obtained 6-chloro-4,9-dihydro-1,3,4,4-tetramethyl-1H-pyrazolo[3,4-b]quinoline; M.P. 175–177° C., following crystallization from chloroform-ether.

(f) From the reaction of 15 g. of 2-[(3-ethyl-1-methyl-pyrazol-5-yl)amino]-5-chloro-α,α-dimethylbenzyl alcohol with 90 ml. of 85% phosphoric acid there is obtained 6-chloro - 3 - ethyl-4,9-dihydro-1,4,4-trimethyl-1H-pyrazolo [3,4-b]quinoline; M.P. 249–250° C., following crystallization from ether. The monohydrochloride salt, M.P. 264–266° C., is obtained by treating a solution of the free base product in 2-propanol with a 20% solution of hydrogen chloride in 2-propanol and isolating and drying the precipitated solid.

(g) From the reaction of 22 g. of 2-{[1-(2-hydroxy-ethyl)-3-methylpyrazol-5-yl]amino} - 5 - chloro-α,α-dimethylbenzyl alcohol with 90 ml. of 85% phosphoric acid there is obtained 6-chloro-4,9-dihydro-3,4,4-trimethyl-1H-pyrazolo[3,4-b]quinoline - 1 - ethanol; M.P. 222–225° C., following crystallization from ethanol.

(h) From the reaction of 16 g. of 2-[(1,3-dimethyl-pyrazol-5-yl)amino] - 5 - fluoro-α,α-dimethylbenzyl alcohol with 90 ml. of 85% phosphoric acid there is obtained 6-fluoro-4,9-dihydro - 1,3,4,4 - tetramethyl-1H-pyrazolo-[3,4-b]quinoline; M.P. 112–114° C., following crystallization from ethyl acetate-petroleum ether. The monohydrochloride salt, M.P. 207–209° C., is obtained by treating a solution of the free base product in 2-propanol with a 20% solution of hydrogen chloride in 2-propanol, diluting the resulting mixture with ether until precipitation of the solid salt is complete, and isolating and drying the solid obtained.

(i) From the reaction of 12 g. of 2-[(1,3-dimethyl-pyrazol-5-yl)amino] - 5 - methoxy-α,α-dimethylbenzyl alcohol with 90 ml. of 85% phosphoric acid there is obtained 4,9-dihydro-6-methoxy-1,3,4,4 - tetramethyl - 1H-pyrazolo[3,4-b]quinoline; M.P. 195–197° C., following crystallization from ethyl acetate-petroleum ether.

(j) From the reaction of 8 g. of 2 - [(1,3-dimethyl-pyrazol-5-yl)amino] - 5 - (methylthio) - α,α - dimethylbenzyl alcohol with 50 ml. of 85% phosphoric acid there is obtained 4,9-dihydro-1,3,4,4-tetramethyl - 6 - (methylthio)-1H-pyrazolo-[3,4-b]quinoline; M.P. 195–197° C., following crystallization from ethyl acetate.

(k) From the reaction of 17 g. of 4-chloro-2-[(1,3-dimethylpyrazol-5-yl)amino]-α,α-dimethylbenzyl alcohol with 90 ml. of 85% phosphoric acid there is obtained 7-chloro - 4,9 - dihydro - 1,3,4,4 - tetramethyl - 1H - pyrazolo[3,4-b]quinoline; M.P. 228–230° C., following crystallization from ether.

(l) From the reaction of 10 g. of 2-[(1,3-dimethyl-pyrazol-5-yl)amino] - 4 - methoxy-α,α-dimethylbenzyl alcohol with 50 ml. of 85% phosphoric acid there is obtained 4,9 - dihydro - 7 - methoxy - 1,3,4,4 - tetramethyl-1H-pyrazolo[3,4-b]quinoline; M.P. 162–164° C., following crystallization from chloroform-ether. The monohydrochloride salt, M.P. 238–239° C., is obtained by mixing a solution of the free base product in 2-propanol with a 20% solution of hydrogen chloride in 2-propanol, treating the resulting mixture with sufficient ether to effect precipitation of the salt, and isolating and drying the solid obtained.

EXAMPLE 3

A mixture of 3.3 g. of o-{{(1,3 - dimethylpyrazol-5-yl) [3 - (dimethylamino)propyl]}amino} - α,α - dimethylbenzyl alcohol and 60 ml. of 85% phosphoric acid is heated on a steam bath for 2 hours and is then poured into 250 ml. of ice-water. The resulting aqueous mixture is made alkaline with concentrated aqueous sodium hydroxide and the alkaline mixture is extracted with chloroform. The chloroform extract is washed with saturated aqueous sodium bicarbonate, dried, and evaporated to dryness under reduced pressure to give a solid residue of 9-[3-(dimethylamino)propyl] - 4,9 - dihydro-1,3,4,4-tetramethyl-1H-pyrazolo[3,4-b]quinoline. The free base product is dissolved in 2-propanol and the resulting solution is treated with a 20% solution of hydrogen chloride in 2-propanol. To the mixture is then added sufficient tetrahydrofuran to bring about complete precipitation of solid 9-[3-(dimethylamino)propyl] - 4,9-dihydro-1,3,4,4-tetramethyl - 1H - pyrazolo[3,4-b]quinoline, dihydrochloride, hemihydrate, which is isolated and dried; M.P. 220–222° C.

EXAMPLE 4

To a solution of 6.9 g. of 4,9-dihydro-1,3,4,4-tetramethyl-1H-pyrazolo[3,4-b]quinoline in 75 ml. of N,N-dimethylformamide is added in portions 2.5 g. of a 50% sodium hydride in mineral oil dispersion, and the resulting mixture is stirred at room temperature for 30 minutes. 3-dimethylaminopropyl chloride (10 g.) is then added and the mixture is stirred and heated at 50 to 60° C. overnight and concentrated under reduced pressure. The residue is mixed thoroughly with a mixture of 150 ml. of 1 N hydrochloric acid and 150 ml. of ether. The acidic phase is separated, made alkaline with concentrated aqueous sodium hydroxide and the alkaline mixture is extracted with methylene chloride. The methylene chloride extract is dried and evaporated to give an oily residue of 9-[3-(dimethylamino)propyl] - 4,9 - dihydro-1,3,4,4-tetramethyl-1H-pyrazolo[3,4-b]quinoline. The free base product is dissolved in 10 ml. of 2-propanol and to the solution is added 8 ml. of a 20% solution of hydrogen chloride in 2-propanol. The resulting mixture is then treated with tetrahydrofuran to precipitate 9-[3-(dimethylamino)propyl] - 4,9 - dihydro-1,3,4,4-tetramethyl-1H-pyrazolo[3,4-b]quinoline, dihydrochloride, hemihydrate, which is isolated and dried; M.P. 220–222° C.

EXAMPLE 5

Utilizing the procedure described in Example 4 above, the following 9 - [3 - (dimethylamino)propyl]-4,9-dihydro - 1H - pyrazolo[3,4-b]quinoline compounds are obtained from the 9-unsubstituted-4,9-dihydro-1H-pyrazolo[3,4-b]quinolines identified below by first reacting each with 2 g. of a 50% sodium hydride in mineral oil dispersion in 75 ml. of N,N-dimethylformamide and then with 8 g. of 3-dimethylaminopropyl chloride.

(a) From 5.0 g. of 4,4-diethyl-4,9-dihydro-1,3-dimethyl-1H-pyrazolo[3,4-b]quinoline there is obtained 9-[3-(dimethylamino)propyl] - 4,4 - diethyl-4,9-dihydro-1,3-dimethyl-1H-pyrazolo[3,4-b]quinoline; M.P. 85–87° C. following crystallization from ethyl acetate-petroleum ether.

(b) From 6.5 g. of 4,9-dihydro-3,4,4-trimethyl-1-propyl-1H-pyrazolo[3,4-b]quinoline there is obtained 9-[3-dimethylamino)propyl]-4,9 - dihydro - 3,4,4-trimethyl-1-propyl-1H-pyrazolo[3,4-b]quinoline. The free base product is dissolved in ethanol and to the ethanolic solution is added 25 ml. of 1 N sulfuric acid. The resulting mixture is then lyophilized to give 9-[3-(dimethylamino)propyl]-4,9-dihydro-3,4,4-trimethyl - 1 - propyl-1H-pyrazolo[3,4-b]quinoline, monosulfate, monohydrate; M.P. 170° C., following crystallization from acetone-ether.

(c) From 5.0 g. of 4,9-dihydro-3,4,4-trimethyl-1H-pyrazolo[3,4-b]quinoline-1-ethanol there is obtained 9-[3-(dimethylamino)propyl] - 4,9 - dihydro-3,4,4-trimethyl-1H-pyrazolo[3,4-b]quinoline-1-ethanol. The monosulfate salt is obtained as an amorphous solid by treating an ethanolic solution of the free base with an equivalent amount of 1 N sulfuric acid and lyophilizing the resulting mixture; M.P. 85–90° C.

(d) From 6.5 g. of 4,9-dihydro-1,3,4,4,6-pentamethyl-1H-pyrazolo[3,4-b]quinoline there is obtained 9-[3-(dimethylamino)propyl]-4,9-dihydro - 1,3,4,4,6 - pentamethyl-1H-pyrazolo[3,4-b]quinoline. The free base product is dissolved in 2-propanol and the solution is treated with a 20% solution of hydrogen chloride in 2-propanol. The resulting mixture is then diluted with sufficient tetrahydrofuran to bring about complete precipitation of 9-[3-(dimethylamino)propyl]-4,9-dihydro - 1,3,4,4,6 - pentamethyl-1H-pyrazolo[3,4-b]quinoline, dihydrochloride, monohydrate, which is isolated and dried; M.P. 211–213° C. (with decomposition).

(e) From 6.5 g. of 6-chloro-4,9-dihydro-1,3,4,4-tetramethyl-1H-pyrazolo[3,4-b]quinoline there is obtained 6-chloro-9-[3-(dimethylamino)propyl] - 4,9 - dihydro - 1,3,4,4-tetramethyl-1H-pyrazolo[3,4-b]quinoline. A solution of the free base product in 2-propanol is mixed with a 20% solution of hydrogen chloride in 2-propanol, and the resulting mixture is treated with sufficient tetrahydrofuran to bring about complete precipitation of 6-chloro-9-[3-(dimethylamino)propyl]-4,9-dihydro - 1,3,4,4 - tetramethyl-1H-pyrazolo[3,4-b]quinoline, dihydrochloride, dihydrate, which is isolated and dried; M.P. 224–226° C.

(f) From 8.0 g. of 6-chloro-3-ethyl-4,9-dihydro-1,4,4-trimethyl - 1H - pyrazolo[3,4-b]quinoline there is obtained 6-chloro-9-[3-(dimethylamino)propyl] - 3 - ethyl-4,9 - dihydro - 1,4,4-trimethyl-1H-pyrazolo[3,4-b]quinoline. A solution of the free base product in 15 ml. of acetone is mixed with a solution of 1.2 g. of oxalic acid in 15 ml. of acetone and the 6-chloro-9-[3-(dimethylamino)propyl]-3-ethyl-4,9-dihydro - 1,4,4 - trimethyl-1H-pyrazolo[3,4-b]quinoline, mono - oxalate, monohydrate that precipitates is isolated and dried; M.P. 155° C. (with decomposition).

(g) From 5.0 g. of 6-fluoro-4,9-dihydro-1,3,4,4-tetramethyl-1H-pyrazolo[3,4-b]quinoline there is obtained 9-[3-(dimethylamino)propyl] - 6 - fluoro-4,9-dihydro-1,3,4,4-tetramethyl-1H-pyrazolo[3,4-b]quinoline. A solution of the free base product in 2-propanol is mixed with a 20% solution of hydrogen chloride in 2-propanol, and the resulting mixture is treated with sufficient tetrahydrofuran to bring about complete precipitation of 9-[3-(dimethylamino)propyl]-6-fluoro - 4,9 - dihydro-1,3,4,4-tetramethyl-1H-pyrazolo[3,4 - b]quinoline, dihydrochloride, dihydrate, which is isolated and dried; M.P. 202–205° C. (with decomposition).

(h) From 5.5 g. of 4,9-dihydro-6-methoxy-1,3,4,4-tetramethyl-1H-pyrazolo[3,4-b]quinoline there is obtained 9-[3-(dimethylamino)propyl] - 4,9 - dihydro-6-methoxy-1,3,4,4-tetramethyl - 1H - pyrazolo[3,4-b]quinoline. A solution of the free base product in 20 ml. of acetone is mixed with a solution of 2.0 g. of oxalic acid in 20 ml. of acetone and the 9-[3-(dimethylamino)propyl]-4,9-dihydro - 6 - methoxy-1,3,4,4-tetramethyl-1H-pyrazolo[3,4-b]quinoline, mono-oxalate that precipitates is isolated and dried; M.P. 158–160° C.

(i) From 6.2 g. of 4,9-dihydro-1,3,4,4-tetramethyl-6-(methylthio)-1H-pyrazolo[3,4-b]quinoline there is obtained 9-[3-(dimethylamino)propyl] - 4,9 - dihydro - 1,3,4,4 - tetramethyl - 6 - (methylthio)-1H-pyrazolo[3,4-b]quinoline. The monosulfate salt is obtained as an amorphous solid by treating an ethanolic solution of the free base with an equivalent amount of 1 N sulfuric acid and lyophilizing the resulting mixture.

(j) From 6.5 g. of 7-chloro-4,9-dihydro-1,3,4,4-tetramethyl-1H-pyrazolo[3,4-b]quinoline there is obtained 7-chloro-9-[3-(dimethylamino)propyl] - 4,9 - dihydro - 1,3,4,4-tetramethyl - 1H - pyrazolo[3,4-b]quinoline. A solution of the free base product in 2-propanol is mixed with a 20% solution of hydrogen chloride in 2-propanol and the resulting mixture is treated with sufficient tetrahydrofuran to bring about complete precipitation of 7-chloro-9-[3-(dimethylamino)propyl] - 4,9 - dihydro - 1,3,4,4-tetramethyl - 1H - pyrazolo[3,4-b]quinoline, dihydrochloride, monohydrate, which is isolated and dried; M.P. 170° C. (with decomposition).

(k) From 5.4 g. of 4,9-dihydro-7-methoxy-1,3,4,4-tetramethyl - 1H - pyrazolo[3,4-b]quinoline there is obtained 9-[3-(dimethylamino)propyl] - 4,9 - dihydro - 7-methoxy-1,3,4,4-tetramethyl - 1H - pyrazolo[3,4-b]quinoline. A solution of the free base product in 2-propanol is mixed with a 20% solution of hydrogen chloride in 2-propanol, and the resulting mixture is treated with sufficient tetrahydrofuran to bring about complete precipitation of 9-[3 - (dimethylamino)propyl]-4,9-dihydro-7-methoxy - 1,3,4,4 - tetramethyl-1H-pyrazolo[3,4-b]quinoline, dihydrochloride, monohydrate, which is isolated and dried; M.P. 223–225° C.

EXAMPLE 6

To a solution of 22 g. of 4,9-dihydro-1,3,4,4-tetramethyl - 1H - pyrazolo[3,4-b]quinoline in 150 ml. of N,N-dimethylformamide is added in portions first 7 g. of a 50% sodium hydride in mineral oil dispersion and then 22 g. of 1-bromo-3-chloropropane, and the resulting mixture is stirred and heated at 50–55° C. overnight and concentrated under reduced pressure. The residue is mixed well with a mixture of 300 ml. of 2 N hydrochloric acid and 100 ml. of ether, and the aqueous phase is separated and made alkaline with concentrated aqueous sodium hydroxide. The alkaline mixture is extracted with chloroform, and the chloroform extract is dried and evaporated to dryness to give a solid product, which is a mixture of predominantly 9-(3-chloropropyl) - 4,9 - dihydro-1,3,4,4-tetramethyl-1H-pyrazolo[3,4-b]quinoline and 9 - (3-bromopropyl)-4,9-dihydro-1,3,4,4-tetramethyl-1H - pyrazolo[3,4-b]quinoline; M.P. 107-110° C., following crystallization from petroleum ether. This solid product mixture is used in the reaction below without further purification.

The intermediate product obtained as described above (6.2 g.) is added to 150 ml. of a saturated solution of methylamine in 2-propanol, and the resulting mixture is stirred and heated under reflux for 18 hours and evaporated under reduced pressure. The residue is mixed well with a mixture of 150 ml. of 1 N hydrochloric acid and 100 ml. of benzene, and the aqueous phase is separated and made alkaline with concentrated aqueous sodium hydroxide. The alkaline mixture is extracted with methylene chloride, and the methylene chloride extract is concentrated under reduced pressure to give an oily residue of 4,9-dihydro-1,3,4,4-tetramethyl-9-[3 - (methylamino)propyl]-1H-pyrazolo[3,4-b]quinoline, which is dissolved in 2-propanol. The solution is mixed with a 20% solution of hydrogen chloride in 2-propanol, and the resulting mixture is treated with tetrahydrofuran to precipitate 4,9-dihydro-1,3,4,4-tetramethyl - 9 - [3-(methylamino)propyl]-1H-pyrazolo[3,4-b]quinoline, dihydrochloride, monohydrate, which is isolated and dried; M.P. 198–200° C. (with decomposition).

EXAMPLE 7

To a solution of 7.8 g. of 6-chloro-4,9-dihydro-1,3,4,4-tetramethyl-1H-pyrazolo[3,4-b]quinoline in 75 ml. of N,N-dimethylformamide is added in portions first 2.5 g. of a 50% sodium hydride in mineral oil dispersion and then 8.0 g. of 1,3-dibromopropane, and the resulting mixture is stirred and heated at 50–55° C. for 8 hours and concentrated under reduced pressure. The residue is dissolved in chloroform and the chloroform solution is washed with water, dried, and evaporated under reduced pressure to give an oily residue of 9-(3-bromopropyl)-6-chloro-4,9-dihydro - 1,3,4,4 - tetramethyl - 1H - pyrazolo-[3,4-b]quinoline, which is converted into an amorphous solid upon trituration with petroleum ether. It is suitable for use in the reaction below without further purification.

A mixture of 7.5 g. of 9-(3-bromopropyl)-6-chloro-4,9-dihydro - 1,3,4,4 - tetramethyl - 1H - pyrazolo[3,4-b] quinoline, obtained as described above, and 250 ml. of a saturated solution of methylamine in 2-propanol is stirred and heated under reflux for 18 hours and then concentrated under reduced pressure. The residue is mixed well with a mixture of 150 ml. of 1 N hydrochloric acid and 100 ml. of benzene, and the aqueous phase is separated and made alkaline with concentrated aqueous sodium hydroxide. The alkaline mixture is extracted with methylene chloride and the methylene chloride extract is evaporated under reduced pressure to give an oily residue of 6-chloro-4,9-dihydro-1,3,4,4-tetramethyl-9-[3 - (methylamino)propyl]-1H-pyrazolo[3,4-b]quinoline. A solution of the free base product in 2-propanol is mixed with a 20% solution of hydrogen chloride in 2-propanol, and the resulting mixture is treated with sufficient tetrahydrofuran to effect complete precipitation of 6-chloro - 4,9 - dihydro-1,3,4,4-tetramethyl-9-[3-(methylamino)propyl] - 1H - pyrazolo-[3,4-b]quinoline, dihydrochloride, which is isolated and dried; M.P. 140–143° C.

EXAMPLE 8

A mixture of 9 - (3-chloropropyl)-4,9-dihydro-1,3,4,4-tetramethyl - 1H - pyrazolo[3,4-b]quinoline and 9-(3-bromopropyl)-4,9-dihydro-1,3,4,4-tetramethyl-1H - pyrazolo-[3,4-b]quinoline (obtained as described in Example 6 above; 9.0 g.) is dissolved in 25 ml. of N,N-dimethylformamide and to the solution is added 3.0 g. of sodium azide. The resulting mixture is stirred and heated at 50° C. overnight and then concentrated under reduced pressure. The residue is dissolved in ethyl acetate and the solution is washed several times with water, dried, and evaporated to give a residue of 9-(3-azidopropyl)-4,9-dihydro-1,3,4,4-tetramethyl-1H-pyrazolo[3,4 - b]quinoline, which is suitable for use in the reaction below without further purification.

To a stirred mixture consisting of 1.2 g. of lithium aluminum hydride, 80 ml. of tetrahydrofuran, and 40 ml. of ether at 10° C. is added a solution of 9.3 g. of 9-(3-azidopropyl) - 4,9 - dihydro-1,3,4,4-tetramethyl-1H-pyrazolo[3,4-b]quinoline in 25 ml. of ether, and the resulting mixture is heated under reflux for 2 hours, cooled, and treated carefully with 3 ml. of water, 3 ml. of 20% aqueous sodium hydroxide, and 5 ml. of water. The hydrolyzed mixture is filtered and the filtrate is mixed thoroughly with 100 ml. of 1N hydrochloric acid and 75 ml. of ether. The acidic aqueous phase is made alkaline with concentrated aqueous sodium hydroxide, and the alkaline mixture is exracted with methylene chloride. The methylene chloride extract is evaporated, and the residue, which is 9-(3-aminopropyl)-4,9-dihydro-1,3,4,4-tetramethyl - 1H - pyrazolo[3,4-b]quinoline, is dissolved in 2-propanol. This solution is mixed with a 20% solution of hydrogen chloride in 2-propanol, and the resulting mixture is treated with tetrahydrofuran to precipitate 9-(3-aminopropyl)-4,9-dihydro-1,3,4,4 - tetramethyl - 1H - pyrazolo [3,4-b]quinoline. dihydrochloride, which is isolated and dried; M.P. 250–252° C. (with decomposition).

EXAMPLE 9

An aqueous solution of 4.0 g. of 9-[3-(dimethylamino) propyl]-4,9-dihydro-1,3,4,4 - tetramethyl - 1H - pyrazolo [3,4-b]quinoline, dihydrochloride, hemihydrate is made neutral with dilute aqueous sodium hydroxide, and the resulting mixture is extracted with 50 ml. of chloroform. To the chloroform extract is added 2.5 g. of m-chloroperbenzoic acid and the mixture is kept at room temperature overnight. The solution obtained is washed with dilute aqueous sodium bicarbonate until it is neutral, dried, and evaporated to give a residue of 9-[3-(dimethylamino)propyl]-4,9-dihydro-1,3,4,4-tetramethyl - 1H - pyrazolo[3,4-b]quinoline, $N^\gamma$-oxide. This free base N-oxide product is dissolved in 10 ml. of 2-propanol, the solution is mixed with 6 ml. of a 20% solution of hydrogen chloride in 2-propanol, and the resulting mixture is treated with tetrahydrofuran to precipitate 9-[3-(dimethylamino)propyl]-4,9-dihydro-1,3,4,4 - tetramethyl - 1H - pyrazolo [3,4-b]quinoline, $N^\gamma$-oxide, dihydrochloride, which is isolated and dried; M.P. 225° C. (with decomposition).

EXAMPLE 10

(a) An asueous solution of 4.5 g. of 6-chloro-9[3-(dimethylamino)propyl]-4,9-dihydro - 1,3,4,4 - tetramethyl-1H-pyrazolo[3,4-b]quinoline, hydrochloride, dihydrate is made neutral with dilute aqueous sodium hydroxide, and the resulting mixture is extracted with 50 ml. of chloroform. To the chloroform extract is added 2.5 g. of m-chloroperbenzoic acid and the mixture is kept at room temperature overnight. The solution that results is washed with dilute aqueous sodium bicarbonate until it is neutral, dried, and evaporated to give a residue of 6-chloro-9-[3-(dimethylamino)propyl]-4,9 - dihydro - 1,3,4,4 - tetramethyl-1H-pyrazolo[3,4-b]-quinoline, $N^\gamma$-oxide. This free base N-oxide product is dissolved in 10 ml. of 2-propanol, the solution is mixed with 6 ml. of a 20% solution of hydrogen chloride in 2-propanol, and the resulting mixture is treated with tetrahydrofuran to precipitate 6-chloro-9-[3-(dimethylamino)propyl]-4,9 - dihydro - 1,3,4,4 - tetramethyl-1H-pyrazolo[3,4-b]-quinoline, $N^\gamma$-oxide, dihydrochloride, which is isolated and dried; M.P. 209–211° C.

(b) Utilizing the procedure described in (a) above, starting with 3.5 g. of 7-chloro-9-[3-(dimethylamino)propyl] - 4,9 - dihydro - 1,3,4,4 - tetramethyl - 1H - pyrazolo [3,4-b]-quinoline and using 1.8 g. of m-chloroperbenzoic acid, there are obtained 7-chloro-9-[3-(dimethylamino) propyl]-4,9-dihydro-1,3,4,4 - tetramethyl - 1H - pyrazolo [3,4-b]quinoline, $N^\gamma$-oxide and the dihydrochloride, monohydrate salt thereof; the salt has M.P. 170–172° C. (with decomposition).

STARTING MATERIALS

The various starting materials employed in the foregoing examples and intermediates required for their preparation are obtained by the methods described in the following. In each case below the solvent given in parentheses following a melting point is the solvent used for crystallization.

(A) N-(pyrazol-5-yl)anthranilic acids (1) N-(3-methyl-1-propylpyrazol-5-yl)anthranilic acid. To a mixture of 69 g. of anthranilic acid and 200 ml. of acetic acid, at 70° C., is first added 50 g. of diketene and then, after one hour, 79 g. of acetic anhydride. The resulting mixture is heated at 80–85° C. for 2 hours and after cooling, 32 g. of n-propylhydrazine is added. The reaction mixture is then heated to 80° C. for 3 hours, cooled, and diluted with water to give a solid precipitate of N-(3-methyl-1-propylpyrazol - 5 - yl)anthranilic acid; M.P. 150–151° C.

(2) N-[1-(2-hydroxyethyl)-3-methylpyrazol - 5 - yl] anthranilic acid; M.P. 213–214° C. (acetic acid); obtained by the method of (1) above by substituting 33 g. of 2-hydroxyethylhydrazine for the n-propylhydrazine.

(3) N - (1,3 - dimethylpyrazol - 5 - yl) - 5 - methyl-anthranilic acid, M.P. 190–192° C. (2-propanol); obtained by the method of (1) above from the reaction of 70 g. of 5-methylanthranilic acid, 50 g. of diketene, 79 g. of acetic anhydride, and 25 g. of methylhydrazine.

(4) 5-chloro-N-(1,3 - dimethylpyrazol - 5 - yl)anthranilic acid, M.P. 229–230° C. (with decomposition); obtained by the method of (1) above from the reaction of 85 g. of 5-chloroanthranilic acid, 50 g. of diketene, 79 g. of acetic anhydride, and 25 g. of methylhydrazine.

(5) 5-chloro-N-(3 - ethyl - 1 - methylpyrazol - 5 - yl)-anthranilic acid. A mixture consisting of 48 g. of 2,5-dichlorobenzoic acid, 31 g. of 5-amino-3-ethyl-1-methyl-pyrazole, 35 g. of anhydrous potassium carbonate, 29 g. of N-ethylmorpholine, 5 g. of cupric acetate, and 110 ml. of N,N-dimethylformamide is stirred and heated at 110° C. overnight, cooled, and diluted with 350 ml. of 1 N sodium hydroxide. The mixture is treated with activated charcoal and filtered, and the filtrate is acidified with concentrated hydrochloric acid. Upon cooling, there is obtained 5-chloro-N-(3 - ethyl - 1 - methyl-pyrazol-5-yl)anthranilic acid; M.P. 217–219° C. (2-propanol).

(6) N-[1-(2 - hydroxyethyl) - 3 - methylpyrazol - 5-yl] - 5 - chloroanthranilic acid (characterized as the hydrochloride salt, M.P. 202–204° C., following crystallization from 20% hydrogen chloride in 2-propanol); obtained by the method of (5) above from a reaction mixture consisting of 42.5 g. of 5-amino-1-(2-hydroxyethyl)-3-methylpyrazole, 57.5 g. of 2,5-dichlorobenzoic acid, 35 g. of N-ethylmorpholine, 43 g. of anhydrous potassium carbonate, 6 g. of cupric acetate, and 140 ml. of N,N-dimethylformamide.

(7) 5-fluoro-N-(1,3 - dimethylpyrazol - 5 - yl)anthranilic acid, M.P. 230–232° C. (ethanol); obtained by the method of (1) above from the reaction of 49 g. of 5-fluoroanthranilic acid, 35 g. of diketene, 50 g. of acetic anhydride, and 18 g. of methylhydrazine in 125 ml. of acetic acid.

(8) N-(1,3-dimethylpyrazol - 5 - yl) - 5 - methoxyan-thranilic acid, M.P. 175–177° C. (ethyl acetate); obtained by the method of (5) above from a reaction mixture consisting of 31 g. of 2-chloro-5-methoxybenzoic acid, 23 g. of anhydrous potassium carbonate, 20 g. of N-ethyl-morpholine, 19 g. of 5-amino - 1,3 - dimethylpyrazole, and 100 ml. of N,N-dimethylformamide.

(9) N-(1,3 - dimethylpyrazol - 5 - yl) - 5 - (methyl-thio)anthranilic acid, M.P. 209–210° C. (2-propanol); obtained by the method of (5) above from a reaction mixture consisting of 28 g. of 2-chloro - 5 - (methylthio) benzoic acid, 15.5 g. of 5-amino-1,3-dimethylpyrazole, 21 g. of anhydrous potassium carbonate, 17 g. of N-ethyl-morpholine, 6 g. of cupric acetate, and 250 ml. of N,N-dimethylformamide.

(10) N-(1,3 - dimethylpyrazol - 5 - yl)-4-methoxy-anthranilic acid, M.P. 231–232° C. (ethanol); obtained by the method of (1) above from the reaction of 78 g. of 4-methoxyanthranilic acid, 50 g. of diketene, 79 g. of acetic anhydride, and 26 g. of methylhydrazine in 200 ml. of acetic acid.

(B) N-(pyrazol-5-yl)anthranilic acid, methyl esters (1) N-(1,3 - dimethylpyrazol - 5 - yl)anthranilic acid, methyl ester, monohydrochloride. A mixture of 56 g. of N-(1,3 - dimethylpyrazol - 5 - yl)anthranilic acid and 1.5 liters of a saturated methanolic solution of hydrogen chloride is heated under reflux for 2 hours and is then evaporated to dryness under reduced pressure to give a solid residue of N-(1,3-dimethylpyrazol - 5 - yl)anthranilic acid, methyl ester, monohydrochloride; M.P. 195° C. (acetone-ether).

(2) N-(3-methyl - 1 - propylpyrazol - 5 - yl)anthranilic acid, methyl ester. A mixture of 28.4 g. of N-(3-methyl - 1 - propylpyrazol-5-yl)anthranilic acid and 750 ml. of a saturated methanolic solution of hydrogen chloride is heated under reflux for 2 hours and evaporated under reduced pressure. The solid residue obtained is dissolved in ethyl acetate and the solution is neutralized by treatment with 5% aqueous sodium bicarbonate. The crystalline solid that is obtained from the ethyl acetate phase is isolated and dried; M.P. 149–151° C.

(3) N-[1-(2-hydroxyethyl) - 3 - methylpyrazol-5-yl]-anthranilic acid, methyl ester, M.P. 95–99° C. (ethyl acetate-petroleum ether); obtained by the method of (2) above from the reaction of N-[1-(2-hydroxyethyl)-3-methylpyrazol - 5 - yl]anthranilic acid with saturated methanolic hydrogen chloride.

(4) N-(1,3-dimethylpyrazol - 5 - yl) - 5 - methylan-thranilic acid, methyl ester, M.P. 57–59° C. (ethyl acetate-petroleum ether); obtained by the method of (2) above from the reaction of N-(1,3 - dimethylpyrazol-5-yl) - 5 - methylanthranilic acid with saturated methanolic hydrogen chloride.

(5) 5-chloro-N-(1,3-dimethylpyrazol - 5 - yl)anthra-nilic acid, methyl ester, M.P. 55–56° C. (ethyl acetate-petroleum ether); obtained by the method of (2) above from the reaction of 5-chloro-N-(1,3 - dimethylpyrazol-5-yl)anthranilic acid with saturated methanolic hydrogen chloride.

(6) 5-chloro-N-(3-ethyl - 1 - methylpyrazol - 5 - yl)-anthranilic acid, methyl ester, monohydrochloride, M.P. 202–204° C. (2-propanol-ether); obtained by the method of (1) above from the reaction of 5-chloro-N-(3-ethyl-1-methylpyrazol - 5 - yl)anthranilic acid with saturated methanolic hydrogen chloride.

(7) N-[1 - (2-hydroxyethyl) - 3 - methylpyrazol-5-yl]-5 - chloroanthranilic acid, methyl ester, monohydrochloride; obtained as a somewhat impure solid that is suitable for use without further purification by the method of (1) above from the reaction of N-[1 - (2 - hydroxyethyl)-3-methylpyrazol-5-yl]-5 - chloroanthranilic acid with saturated methanolic hydrogen chloride.

(8) 5-fluoro-N-(1,3 - dimethylpyrazol-5-yl)anthranilic acid, methyl ester, monohydrochloride, M.P. 168–170° C. (2-propanol); obtained by the method of (1) above from the reaction of 5-fluoro-N-(1,3-dimethylpyrazol-5-yl)an-thranilic acid with saturated methanolic hydrogen chloride.

(9) N-(1,3-dimethylpyrazol - 5 - yl)-5-methoxyantra-nilic acid, methyl ester; obtained as an oil that is suitable for further use without further purification by the method of (2) above from the reaction of N-(1,3 - dimethylpy-razol-5-yl)-5-methoxyanthranilic acid with saturated meth-anolic hydrogen chloride. The monohydrochloride salt, M.P. 140–142° C., is obtained by crystallizing the oily free base product from a 20% solution of hydrogen chloride in 2-propanol.

(10) N-(1,3 - dimethylpyrazol-5-yl)-5-(methylthio)anthranilic acid, methyl ester, monohydrochloride, M.P. 168–170° C. (2-propanol-ether); obtained by the method of (1) above from the reaction of N-(1,3-dimethylpyrazol-5-yl)-5-(methylthio)anthranilic acid with saturated methanolic hydrogen chloride.

(11) 4 - chloro-N-(1,3 - dimethylpyrazol-5-yl)anthranilic acid, methyl ester, M.P. 110–113° C. (acetone-ether); obtained by the method of (2) above from the reaction of 4 - chloro-N-(1,3-dimethylpyrazol-5-yl)anthranilic acid with saturated methanolic hydrogen chloride.

(12) N-(1,3 - dimethylpyrazol - 5 - yl)-4-methoxyanthranilic acid, methyl ester, M.P. 140° C. (ethyl acetate); obtained by the method of (2) above from the reaction of N-(1,3-dimethylpyrazol-5-yl) - 4 - methoxyanthranilic acid with saturated methanolic hydrogen chloride.

(C) o-[(Pyrazol-5-yl)amino]-α,α-dialkylbenzyl alcohols (1) o-[(1,3 - dimethylpyrazol - 5 - yl)amino]-α,α-dimethylbenzyl alcohol. To a solution of methyl magnesium iodide (prepared from 9.6 g. of magnesium turnings, 57 g. of methyl iodide, and 150 ml. of dry ether) is added in portions 14 g. of N-(1,3-dimethylpyrazol-5-yl)anthranilic acid, methyl ester, monohydrochloride and the resulting mixture is stirred and heated under reflux for 3 hours. After standing at room temperature overnight, the mixture is treated with 100 ml. of saturated aqueous ammonium chloride and the organic phase is separated, dried, and concentrated under reduced pressure to give an oily residue of o-[(1,3 - dimethylpyrazol-5-yl)amino]-α,α-dimethylbenzyl alcohol, which solidifies upon standing; M.P. 120–122° C. The monohydrochloride salt, M.P. 155–157° C., is obtained by crystallizing the free base product from a mixture of a 20% hydrogen chloride solution in 2-propanol and ethyl acetate.

(2) o-[(1,3 - dimethylpyrazol-5-yl)amino]-α,α-diethylbenzyl alcohol, M.P. 140–143° C. (ether); obtained by the method of (1) above from the reaction of 21.0 g. of N-(1,3-dimethylpyrazol-5-yl)anthranilic acid, methyl ester, monohydrochloride with ethyl magnesium bromide (prepared from 54.5 g. of ethyl bromide).

(3) o-[(3-methyl - 1 - propylpyrazol-5-yl)amino]-α,α-dimethylbenzyl alcohol, M.P. 115–117° C. (ether-petroleum ether); obtained by the method of (1) above from the reaction of 21 g. of N-(3 - methyl-1-propylpyrazol-5-yl)anthranilic acid, methyl ester with methyl magnesium iodide (prepared from 47.3 g. of methyl iodide and 8 g. of magnesium).

(4) o-{[1-(2-hydroxyethyl) - 3 - methylpyrazol-5-yl]-amino}-α,α-dimethylbenzyl alcohol, M.P. 116–119° C. (ether-petroleum ether); obtained by the method of (1) above from the reaction of N-[1 - (2 - hydroxyethyl)-3-methylpyrazol-5-yl]anthranilic acid, methyl ester with methyl magnesium iodide.

(5) 2 - [(1,3 - dimethylpyrazol-5-yl)amino]-5-methyl-α,α-dimethylbenzyl alcohol, M.P. 113–114° C. (ethyl acetate-petroleum ether); obtained by the method of (1) above from the reaction of N-(1,3-dimethylpyrazol-5-yl)-5-methylanthranilic acid, methyl ester with methyl magnesium iodide.

(6) 2 - [(1,3 - dimethylpyrazol-5-yl)amino]-5-chloro-α,α-dimethylbenzyl alcohol, M.P. 131–134° C. (ether); obtained by the method of (1) above from the reaction of 5-chloro-N-(1,3 - dimethylpyrazol - 5 - yl)anthranilic acid, methyl ester with methyl magnesium iodide.

(7) 5 - chloro - 2 - [(3-ethyl - 1 - methylpyrazol-5-yl)-amino]-α,α-dimethylbenzyl alcohol, M.P. 112–114° C. (ethyl acetate-petroleum ether); obtained by the method of (1) above from the reaction of 5-chloro-N-(3-ethyl-1-methylpyrazol-5-yl)anthranilic acid, methyl ester, monohydrochloride with methyl magnesium iodide.

(8) 2-{[1-(2-hydroxyethyl) - 3 - methylpyrazol-5-yl]-amino} - 5 - chloro-α,α-dimethylbenzyl alcohol, M.P. 142–144° C. (chloroform); obtained by the method of (1) above from the reaction of N-[1 - (2 - hydroxyethyl)-3-methylpyrazol-5-yl]-5-chloroanthranilic acid, methyl ester, monohydrochloride with methyl magnesium iodide.

(9) 2-[1,3 - dimethylpyrazol - 5 - yl)amino]-5-fluoro-α,α-dimethylbenzyl alcohol, M.P. 102–104° C. (ether); obtained by the method of (1) above from the reaction of 5-fluoro-N-(1,3 - dimethylpyrazol - 5 - yl)anthranilic acid, methyl ester, monohydrochloride with methyl magnesium iodide.

(10) 2-[1,3 - dimethylpyrazol-5-yl)amino]-5-methoxy-α,α-dimethylbenzyl alcohol, M.P. 96–99° C. (ethyl acetate-petroleum ether); obtained by the method of (1) above from the reaction of N-(1,3-dimethylpyrazol-5-yl)-5-methoxyanthranilic acid, methyl ester, monohydrochloride with methyl magnesium iodide.

(11) 2-[(1,3 - dimethylpyrazol-5-yl)amino]-5-(methylthio) - α,α - dimethylbenzyl alcohol, M.P. 108–110° C. (ethyl acetate-petroleum ether); obtained by the method of (1) above from the reaction of N-(1,3-dimethylpyrazol-5-yl)-5-methylthio)anthranilic acid, methyl ester, monohydrochloride with methyl magnesium iodide.

(12) 4-chloro-2-[(1,3-dimethylpyrazol - 5 - yl)amino]-α,α-dimethylbenzyl alcohol, M.P. 183° C. (chloroform); obtained by the method of (1) above from the reaction of 4-chloro-N-(1,3-dimethylpyrazol-5-yl)anthranilic acid, methyl ester with methyl magnesium iodide.

(13) 2-[(1,3-dimethylpyrazol - 5 - yl)amino]-4-methoxy-α,α-dimethylbenzyl alcohol, M.P. 162–164° C. (ether); obtained by the method of (1) above from the reaction of N-(1,3-dimethylpyrazol - 5 - yl)-4-methoxyanthranilic acid, methyl ester with methyl magnesium iodide.

(D) o-{{(1,3-dimethylpyrazol-5-yl) [3-(dimethylamino) propyl]}amino}-α,α-dimethylbenzyl alcohol To a stirred suspension of 8.0 g. of o-[(1,3-dimethylpyrazol - 5 - yl)amino]-α,α-dimethylbenzyl alcohol in 150 ml. of ether, at 20–25° C., is carefully added 50 ml. of a 1.4 N solution of n-butyllithium in heptane and the resulting mixture is stirred for 30 minutes. A solution of 10 g. of 3-dimethylaminopropyl chloride in 75 ml. of N,N-dimethylformamide is added and the reaction mixture is first distilled to remove the ether and is then stirred and heated at 65° C. overnight. The mixture is concentrated and the residue is mixed well with a mixture of chloroform and water. The organic phase is separated, dried, and concentrated under reduced pressure. The residue obtained is dissolved in 25 ml. of acetone and to the solution is added a solution of 3.3 g. of oxalic acid in 25 ml. of acetone. The resulting solution is then treated with sufficient ethyl acetate to bring about the crystallization of the oxalate salt of o-{{(1,3-dimethylpyrazol-5-yl)[3-(dimethylamino)propyl]}amino} 1 α,α-dimethylbenzyl alcohol, M.P. 120° The oxalate salt is dissolved in water and the aqueous solution is neutralized with diluted aqueous sodium hydroxide to give the free base product, o-{{(1,3-dimethylpyrazolo - 5 - yl)[3-(dimethylamino)propyl}amino}-α,α-dimethylbenzyl alcohol, suitable for use without further purification.

What is claimed is:

1. A member of the class consisting of 4,9-dihydro-1H-pyrazolo[3,4-b]quinoline compounds having the formula

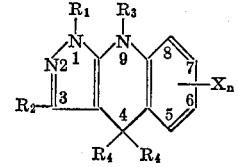

and pharmaceutically-acceptable salts thereof; where $R_1$ is alkyl of not more than 4 carbon atoms or 2-hydroxyethyl, each of $R_2$ and $R_4$ is methyl or ethyl, $R_3$ is a member of the class consisting of hydrogen, 3-aminopropyl, 3-(methylamino)propyl, 3 - (dimethylamino)propyl and a 3-(dimethylamino)propyl, N-oxide group, X is a member of the class consisting of methyl, chloro, fluoro, methoxy, and methylthio, each of said members being substituted in the 6- or 7-position, and $n$ is zero or one.

2. A compound according to claim 1 which is 6-chloro-4,9-dihydro-1,3,4,4-tetramethyl - 1H - pyrazolo[3,4-b]-quinoline.

3. A compound according to claim 1 which is 9-[3-(dimethylamino)propyl]-4,9-dihydro - 1,3,4,4 - tetramethyl-1H-pyrazolo[3,4-b]quinoline.

4. A compound according to claim 1 which is 9-[3-(dimethylamino)propyl] - 4,9 - dihydro-1,3,4,4-tetramethyl-1H-pyrazolo[3,4-b]quinoline, dihydrochloride, hemihydrate.

5. A compound according to claim 1 which is 4,9-dihydro - 1,3,4,4 - tetramethyl-9-[3-(methylamino)propyl]-1H-pyrazolo[3,4-b]quinoline.

6. A compound acording to claim 1 which is 4,9-dihydro - 1,3,4,4 - tetramethyl-9-[3-(methylamino)propyl]-1H - pyrazolo[3,4-b]quinoline, dihydrochloride, monohydrate.

7. A compound according to claim 1 which is 6-chloro-4,9-dihydro - 1,3,4,4 - tetramethyl-9-[3-(methylamino)-propyl]-1H-pyrazolo[3,4-b]quinoline.

8. A compound according to claim 1 which is 6-chloro-4,9-dihydro - 1,3,4,4- - tetramethyl-9-[3-(methylamino)-propyl]-1H-pyrazolo[3,4-b]quinoline, dihydrochloride.

9. A compound according to claim 1 which is 6-chloro-9-[3-(dimethylamino)propyl]-4,9 - dihydro-1,3,4,4-tetramethyl-1H-pyrazolo[3,4-b]quinoline, N$^\gamma$-oxide.

10. A compound according to claim 1 which is 6-chloro-9-[3-(dimethylamino)propyl] - 4,9 - dihydro-1,3,4,4-tetramethyl-1H-pyrazolo[3,4-b]quinoline, N-oxide, dihydrochloride.

References Cited

UNITED STATES PATENTS

| 3,234,132 | 4/1966 | Wolfram | 260—288 R |
| 3,600,393 | 8/1971 | Graeve | 260—288 R |

OTHER REFERENCES

Stein et al.: Chem. Abstr., vol. 72, col. 78941P (1970).

DONALD G. DAUS, Primary Examiner

U.S. Cl. X.R.

260—244 R, 283 S, 283 SY, 288 R, 310 R; 424—258